Patented Aug. 18, 1942

2,293,025

UNITED STATES PATENT OFFICE 2,293,025

GUANIDINE AMMONIUM FERRICYANIDE

Robert B. Barnes, Stamford, Conn., assignor to American Cyanamid Company, New York, N. Y., a corporation of Maine No Drawing. Original application May 28, 1940, Serial No. 337,631. Divided and this application November 1, 1941, Serial No. 417,480

4 Claims. (Cl. 260—439)

The present invention relates to complex ferricyanides, containing guanidine and ammonium radicals, as new compounds and is a division of my copending application Serial No. 337,631, filed May 28, 1940.

It has been discovered that guanidine may be introduced into a compound containing a ferricyanide radical by double decomposition.

For instance, a guanidine ammonium ferricyanide may be formed by adding five mols of solid ammonium carbonate to a saturated solution of diguanidine sodium ferricyanide at about 45° C. After mechanically agitating the mixture for one-half hour and cooling to about 10° C., a precipitate of diguanidine ammonium ferricyanide is obtained.

In a similar manner, the salts may be formed using other soluble guanidine salts by using other soluble ammonium salts, such as the hydrochloride and nitrate, although the carbonate is preferred due to its ease of solution in water. On the other hand, the radical ammonium may be made to displace potassium in diguanidine potassium ferricyanide under substantially the same conditions. The diguanidine alkali metal ferricyanide may be prepared as described in my aforesaid application.

These complex ferricyanides containing a guanidine, may be used for the preparation of iron blues or light sensitive work such as blueprints inasmuch as they exhibit light instability. They are also useful as moth larvae repellents.

While the invention has been described with specific reference to particular embodiments, it is to be understood that it is not to be limited thereto but is to be construed broadly and restricted solely by the scope of the appended claims.

I claim:

1. A guanidine ammonium ferricyanide.
2. Diguanidine ammonium ferricyanide.
3. A method of preparing a guanidine ammonium ferricyanide which comprises reacting a saturated solution of a diguanidine alkali metal ferricyanide with a soluble ammonium salt and cooling to a guanidine ammonium ferricyanide precipitation temperature.
4. A method of preparing a guanidine ammonium ferricyanide which consists in adding five mols of solid ammonium carbonate to a saturated solution of diguanidine sodium ferricyanide, mechanically agitating the mixture and then cooling to a diguanidine ammonium ferricyanide precipitation temperature.

ROBERT B. BARNES.